H. E. MASSEY.
CREDIT ACCOUNTING APPLIANCE.
APPLICATION FILED NOV. 25, 1912.
1,074,886.
Patented Oct. 7, 1913.
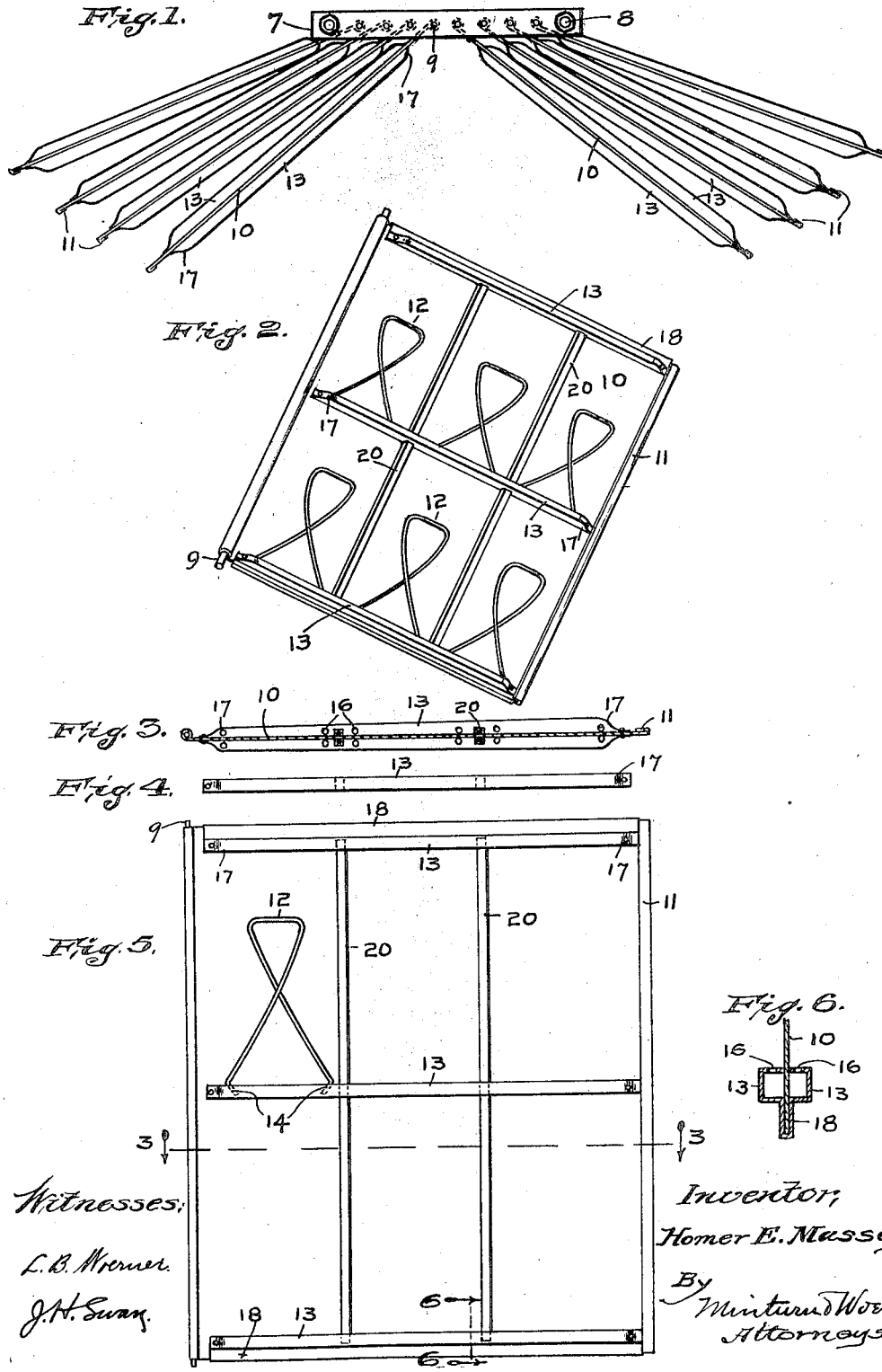

UNITED STATES PATENT OFFICE.

HOMER E. MASSEY, OF SPRINGFIELD, MISSOURI.

CREDIT-ACCOUNTING APPLIANCE.

1,074,886.

Specification of Letters Patent.  Patented Oct. 7, 1913.

Application filed November 25, 1912. Serial No. 733,484.

*To all whom it may concern:*

Be it known that I, HOMER E. MASSEY, a citizen of the United States, residing at Springfield, in the county of Green and State of Missouri, have invented certain new and useful Improvements in Credit-Accounting Appliances, of which the following is a specification.

This invention relates to credit account appliances in which duplicates of sales slips are systematically filed without making book entries of the accounts, the invention having particular reference to the leaves to which clips are attached for holding the slips or bills.

The objects of the invention are to provide bill-holding leaves of improved construction wherein a plurality of clips will be supported on each side of the leaf, and wherein each clip and its sales slips will be set off from every other by projecting strips.

A further object is to provide horizontal sliding strips with flat outer faces which form contacting surfaces for the free movement of the leaves upon each other in opening and closing the book-file in which the leaves are bound, a further object being to provide suitable ones of said horizontal sliding strips so constructed as to support the sliding clips, and to so construct the said sliding strips that they will prevent entanglement of adjacent leaves, and the clips of adjacent leaves with each other.

An additional object of the invention is to provide a simple, inexpensive and durable construction for the purpose intended.

I accomplish the objects of the invention by the mechanism illustrated in the accompanying drawing, in which—

Figure 1 is a top plan view of a file-book comprising a plurality of leaves embodying my invention, the leaves being turned to open position at about the middle of the book. Fig. 2 is a perspective view of one of the leaves detached from the filing book. Fig. 3 is a section on the line 3—3 of Fig. 5. Fig. 4 is an elevation of one of the horizontal sliding strips of a leaf. Fig. 5 is a view in side elevation of one of the leaves removed from the filing book, and showing six sales slip holding spaces with a holding clip in position in one of the spaces, and Fig. 6 is a section on the line 6—6 of Fig. 5.

Like characters of reference indicate like parts throughout the several views of the drawing.

The several leaves of a filing book may be bound together by any of the usual and suitable means, here shown as a frame comprising horizontal bars 7 in pairs, separated a distance apart equal to the lengths of the leaves to permit the latter to be introduced between them, and secured by vertical bolts 8. The bars 7 have sockets in their inner faces to receive the ends of hinge-rods 9. The bodies 10 of the leaves will preferably be formed out of sheet metal with their inner vertical edges turned into a cylindrical roll to receive the hinge-rods 9 with a close moving fit, the rods 9 being preferably round in cross section. The opposite outer edge of the leaf will preferably be reinforced and finished by bending a narrow portion 11 of it over flat against the body of the leaf.

Secured to the body 10 at or near the upper and lower horizontal edges of the leaf, and also between the horizontal tiers of bill-holding clips 12 are the horizontal division strips 13. These are preferably formed out of sheet metal and are hollow, the hollow interior being for the reception of the hook-ends 14, shown in dotted lines in Fig. 5, of the clips 12, and those rubbing strips 13 which are underneath the bill-holding spaces are provided with suitable perforations 16 in their upper faces only, for the introduction therethrough of the hooked-ends 14 of the clips. The clips 12 are formed out of spring tempered wire, of any usual and suitable shape, such as that shown in the drawings. The clips press normally against the leaf 10 and retain the account slips or bills introduced between said clips and the leaf 10.

The projection of the rubbing strips 13 beyond the body 10 of the leaf is greater adjacent the outer edge of the leaf than at the opposite edge, and it is made uniformly tapering, as shown in Fig. 3. This is to facilitate the separation of the pages in opening up an account file or book, as the inner portions of the leaves approach closer to each other than do the outer leaf portions when the book is opened, and to avoid interference with each other and consequent entanglements and interlocking I prefer to round the ends of the rubbing strips, as shown at 17.

The rubbing strips 13, at the top and bottom horizontal edges of the leaves, are preferably made in pairs out of a single piece of metal, each pair comprising rubbing strips which are on opposite sides of the leaf and are connected by integral portions of the metal bent to form a binder 18 which closely embraces the end of the leaf 10. The rubbing strips may be secured by rivets, as shown, or they may be soldered or brazed or welded to the leaf.

The rubbing strips of the several leaves are placed in horizontal series opposite each other, whereby they will contact and form slides which hold the leaves apart and facilitate opening and closing the file book without entanglement of the account slips carried by them.

A further separation of the account slips held by the several clips 12 is secured by means of vertical division strips 20. These are also preferably formed hollow out of sheet metal, and their projection being less than that of the horizontal strips 13, they will be preferably secured by passing them through channels formed for the purpose transversely of the intermediate rubbing strips, and by introducing the ends of the division strips 20 into the top and bottom rubbing strips through suitable openings for the purpose formed through the inner walls of said top and bottom running strips. This is readily done in assembling the parts of the complete leaf.

While I have described my invention with more or less minuteness as regards details of construction and arrangement and as being embodied in certain precise forms I do not desire to be limited thereto unduly or any more than is pointed out in the claims. On the contrary, I contemplate all proper changes in form, construction and arrangement, the omission of immaterial elements and the substitution of equivalents as circumstances may suggest or necessity render expedient.

I claim:

1. A bill-holding leaf for a credit accounting appliance having hollow perforated strips at right angles to the upright hinged edge of the leaf and wire clips having hooked ends inserted into the hollow strips through the perforations of said strips.

2. A bill-holding leaf for credit accounting appliances having hollow longitudinally tapering strips at right angles to the upright hinged edge of the leaf, the tapering strips having their smallest projections at said hinged edge of the leaf.

3. The combination, of a bill-holding leaf, hollow strips secured to the leaf at right angles to the upright hinged edge of the leaf, the top walls of all but the highest of said strips being perforated, and wire clips having hooked ends, said ends being inserted through said perforations into the strips.

4. The combination, of a bill-holding leaf, hollow strips secured to the leaf at right angles to the upright hinged edge of the leaf, the top walls of all but the uppermost of said strips being perforated, wire clips having hooked ends inserted through said perforations into the strips, and division strips parallel with the hinged edge of the leaf.

5. The combination, of a bill-holding leaf, hollow strips secured to the leaf at right angles to the upright hinged edge of the leaf, the top walls of all but the uppermost of said strips being perforated, wire clips having hooked ends inserted through said perforations into the strips, and division strips having ends entering the top and bottom ones of said first strips and passing through the intermediate strips.

6. The combination, of a bill-holding leaf, hollow strips secured to the leaf at right angles to the upright hinged edge of the leaf, the strips adjacent the upper and lower edges of the leaf, on both sides of the leaf having the opposite strips on the two sides formed out of a single piece of sheet metal which is also bent around the adjacent edge of the leaf.

In witness whereof, I, have hereunto set my hand and seal at Indianapolis, Indiana, this, 22d day of October, A. D. one thousand nine hundred and twelve.

HOMER E. MASSEY. [L. S.]

Witnesses:
F. W. WOERNER,
L. B. WOERNER.